(12) United States Patent
Prokop

(10) Patent No.: US 8,550,513 B2
(45) Date of Patent: Oct. 8, 2013

(54) GARDENING APPARATUS

(76) Inventor: David Prokop, Sammamish, WA (US)

( * ) Notice: Subject to any disclaimer, the term of this patent is extended or adjusted under 35 U.S.C. 154(b) by 1042 days.

(21) Appl. No.: 11/758,816

(22) Filed: Jun. 6, 2007

(65) Prior Publication Data

US 2008/0301879 A1    Dec. 11, 2008

(51) Int. Cl.
*A01B 1/02* (2006.01)

(52) U.S. Cl.
USPC .................................. 294/49; 7/116

(58) Field of Classification Search
USPC ......... 294/54.5, 55, 49, 176, 180; 7/114, 116; 173/371, 375; 37/265, 285
See application file for complete search history.

(56) References Cited

U.S. PATENT DOCUMENTS

| | | | | |
|---|---|---|---|---|
| 2,960,230 A | * | 11/1960 | Fracker | 209/419 |
| 3,976,564 A | * | 8/1976 | Holder | 294/55 |
| 4,910,893 A | * | 3/1990 | Asay | 294/49 |
| D395,582 S | * | 6/1998 | Smith | D8/10 |
| 6,662,406 B2 | | 12/2003 | Shonfeld et al. | |
| 6,827,153 B2 | | 12/2004 | Constable | |
| 7,032,941 B2 | | 4/2006 | Heneveld | |
| 7,040,493 B2 | | 5/2006 | Lin | |
| 2005/0006111 A1 | * | 1/2005 | Wherry | 172/371 |

* cited by examiner

*Primary Examiner* — Paul T Chin
(74) *Attorney, Agent, or Firm* — Daniel P. Dooley; Hall Estill Attorneys at Law

(57) ABSTRACT

A gardening apparatus for manipulating soil and/or cutting plants is disclosed, which comprises an implement being made of at least one rigid material, such as steel or plastic, at least one copper rich material coving at least one working surface area of the implement, and a plurality of metal metal alloy buttons containing desired metal elements being fixed on the implement, wherein during an intended use of the gardening apparatus abrasions between the gardening apparatus and the soil and/or plants cause particles of both the at least one copper rich material and plurality of metal metal alloy buttons to be removed therefrom.

17 Claims, 1 Drawing Sheet

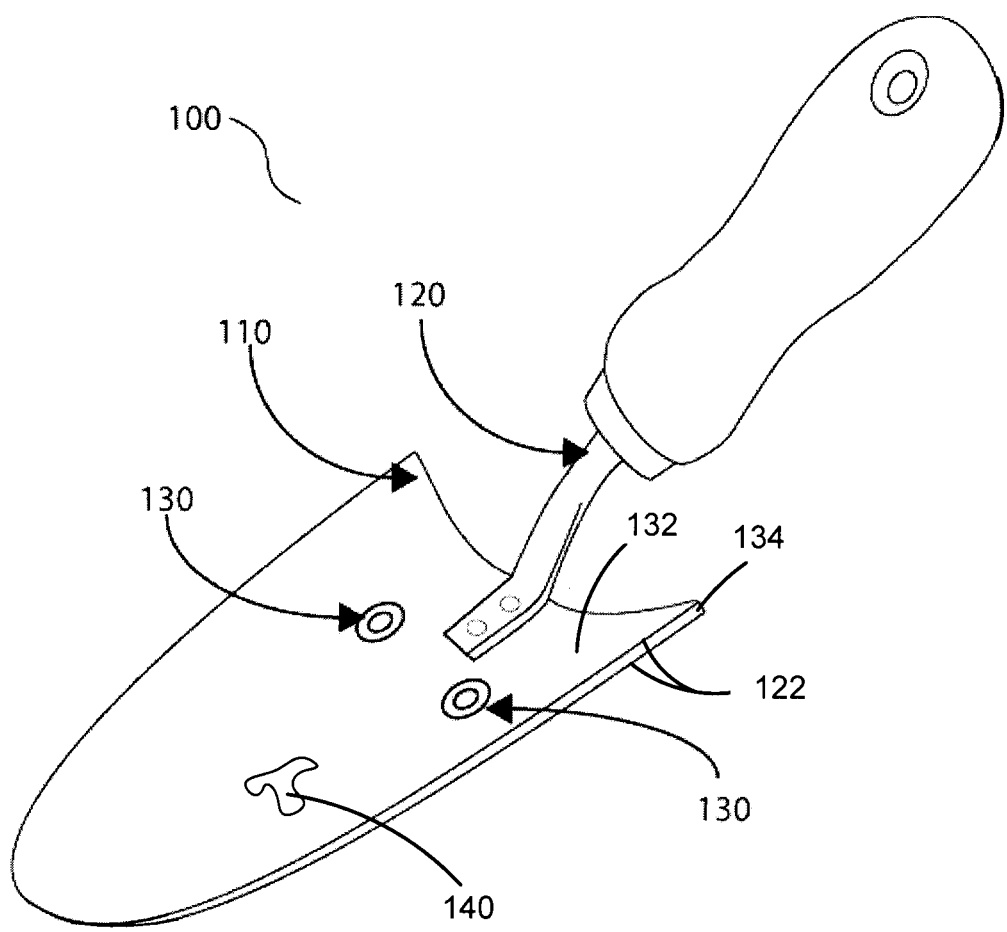

GARDENING APPARATUS

BACKGROUND

The present invention relates generally to gardening tools, and, more particularly, to copper plated gardening tools.

The Chinese began to smelt bronze in the Xia Dynasty (21st-16th centuries BC). About 5,000 years ago, people began to extract brass from ore to make small objects with the cold-forging technique. Then they added a certain percentage of tin to lower the melting point and increase solidity. Tin gave brass a bluish tinge, and the alloy became known as bronze, which in Chinese simply means bluish copper. In the Shang Dynasty, bronze smelting became the most important branch of the handicraft industries. Shang bronzes come in many varieties, chiefly ritual objects, wine vessels, weapons, musical instruments and food containers. Many ritual bronzes were engraved with records of the military exploits of rulers, which are extremely valuable for historical research. Bronze working reached its prime in the Spring and Autumn Period, which covered the period from 770 to 476 BC. Ancient people who used Bronze had secrets of their own for tempering or hardening it in a way which has been lost and never rediscovered. The modern man who made himself a razor of bronze would have a very poor time if he tried to shave with it, but the ancients made sickles, knives, swords, spears, saws, and razors out of this metal. Bronze was the metal used by the old Egyptians in all their wonderful works, and the Greeks, Etruscans, and early Romans were almost entirely dependent on bronze. Iron tools were forbidden in Ancient Greek temples, and the Roman priests of Jupiter used bronze and avoided iron tools for cutting their hair and nails. We find quantities of bronze implements in ancient tombs and have discovered that the usual alloy was nine parts of copper to one of tin. In India, for example, metal-working is most closely associated with the tribal peoples, particularly those of the Vindhyas. Iron is considered the metal of the Sudras, or lowest caste, while copper was assigned to the highest caste Brahmins.

Copper has been shown to be an important element in the growth of plants as it promotes chlorophyll development and improved plant health. Copper is also a known natural fungicide and bactericide, and thereby improves the soil conditions resulting in increased plant growth. Furthermore, copper in the soil is known to repel snails and slugs, which allows the plants to grow unmolested by these pests in a relatively chemical free environment.

Recently, inspired by early research and findings, gardening watering cans, plant pots, and tools made of copper or high copper containing alloys are gaining popularity with gardening hobbyists who want to take advantage of copper's beneficial properties. While hand tools have been produced of copper metal as far back as several millennia, there is a significant disadvantage to pure copper tools in that copper itself is a relatively soft metal, and gardening tools made of copper tend to deform under working loads.

Thus copper metal is not the preferred choice of material for use in tools such as trowels, spades, hoes, shovels, rakes and the like, which are required to have a certain degree of strength and hardness in order to perform their functions. Not surprisingly, the use of copper metal in such tools has been largely replaced by other materials such as; iron, nylon plastic, aluminum, ceramic, fiberglass composite, carbon fiber composite, epoxy resin, and steel.

As such, what is needed in the art are gardening tools that provide all of the beneficial properties of prior art copper gardening tools, that have the requisite strength, and that are able to be mass produced and are less costly to manufacture.

SUMMARY

In view of the foregoing, the present invention provides copper gardening tools that are capable of being produced quickly and in large numbers with the use of automated mass production techniques and facilities. Furthermore, the amount of copper content of the gardening tools of the present invention is a mere fraction of the amount of copper in the copper gardening tools of ancient times, yet all of the beneficial attributes of the prior art copper gardening tools are present in the tools of the present invention. Specifically, the present invention provides gardening tools in which the surfaces of the implement portions have been improved by electroplating them with copper metal. When put into contact with soil, the copper plated tools of the present invention leave trace amounts of copper metal in the soil, which is known to enrich the soil to improve the conditions for growth and the quality of the plants grown in that soil.

In one aspect, the present invention provides copper plated gardening hand trowels. When a copper plated trowel is placed into contact with the soil, trace amounts of copper particles are abraded from the surfaces of the tool leaving trace amounts in the soil. Copper is an important element in the growth of plants, promoting chlorophyll development and improving plant health. Copper is also known to act as a natural fungicide and bactericide, improve corrosion resistance and it repels snails and slugs. A copper hand trowel will leave trace amounts of copper particles in the soil thus deterring slugs and snails from inhabiting the contacted soil. This repulsion of slugs and snails will allow plants to grow unmolested by these pests in a relatively chemical free environment.

In another aspect, the present invention provides gardening tools which have a core of metal or rigid plastic and which have been electroplated or coated with copper or various other elements that are known to improve plant growth when present in the soil in trace amounts. Elements that are known to improve plant growth include gold, silver, boron, zinc, manganese, cobalt, iodine, selenium, beryllium, titanium, and molybdenum. The core of the gardening tool is plated with combinations of such elements, which are abraded into the soil during use of the tool, leading to improved plant growth. In some embodiments, the tools are provided with metal alloy buttons, embedded on the working surface of the implement, which are made of one or more of the beneficial metals mentioned above. The metal alloy buttons contact the soil and leave trace amounts of metal particles in the soil. For example, a copper plated hand trowel may be provided with metal alloy buttons of zinc and manganese embedded on the blade of the trowel to impart trace amounts of gold, silver, boron, zinc, manganese, cobalt, iodine, selenium, beryllium, titanium, and molybdenum particles into the soil. In other embodiments, the implement may be coated with one or more ablative coatings containing one or more of the above elements, which would leave trace amounts of those elements in the soil as the coatings wear away through abrasion with the soil during use of the implement.

In some embodiments, the copper plating may be applied to other gardening tools that come into contact with soil or plants, such as shovels, spades, rakes, hoes, weeders, pruning saws, pruners, knives, shears, lopers, cultivators, tillers, plows, aerators, sod cutters, lawn mower blades, power edger blades, power weed trimming cable, chain saw blades, and the like, to improve the enriching and fungicide, bactericide, and corrosion resistance properties of such tools.

Accordingly, in some embodiments, the present invention provides a gardening tool comprising a handle connected to a functional gardening implement, the implement comprising a hard core that provides shape and strength to the implement and an electroplated layer of copper metal that covers the surface of the core. In some embodiments, the core of the implement is made of steel, and may further include an intermediate layer of nickel that is electroplated to the steel surface of the core and the layer of copper is electroplated to the layer of nickel. In some embodiments, the core of the implement is made of plastic and may further include an intermediate layer of electrically conductive metal, such as palladium, adhered to the plastic core and the layer of copper is electroplated to the layer of conductive metal. In some embodiments, the functional implement may be a shovel, spade, rake, hoe, weeder, pruning saw, pruner, knife, shears, or lopers.

In some embodiments, the present invention provides a method of manufacturing a gardening tool having a handle connected to a functional gardening implement that is covered with a layer of copper for enriching the soil or substrate on which the implement acts, the method comprising obtaining a steel core having a desired shape and strength of the intended implement of the tool, cleaning the surface of the core, electroplating a nickel or copper strike on the cleaned steel surface of the core, electroplating a layer of copper on the nickel or copper strike to yield a finished implement, and attaching a handle to the finished implement to yield the hand tool.

In some embodiments, the present invention provides a method of manufacturing a gardening tool having a handle connected to a functional gardening implement that is covered with a layer of copper for enriching the soil or substrate on which the implement acts, the method comprising obtaining a rigid plastic core having a desired shape and strength of the intended implement of the tool, cleaning the surface of the core, etching the cleaned plastic surface of the core with an acid, adhering a layer of electrically conductive metal to the etched surface of the core, electroplating a layer of copper on the layer of electrically conductive metal to yield a finished implement, and attaching a handle to the finished implement to yield the hand tool.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a perspective view of a gardening hand trowel according to one embodiment of the present invention.

The drawings accompanying and forming part of this specification are included to depict certain aspects of the invention. A clear conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein. It should be noted that the features illustrated in the drawings are not necessarily drawn to scale.

DESCRIPTION

It is understood that the present disclosure is an exemplification of the principles of the invention and does not limit the invention to the illustrated and described embodiments. Therefore, specific details disclosed herein are not to be interpreted as limiting, but rather as a basis for the claims and as a representative basis for teaching one skilled in the art to employ the present invention.

FIG. 1 is a perspective view of an implement (100) according to one embodiment of the present invention. The implement (100) comprises a rigid body (110) and a handle (120) which is attached to the rigid body (110). The functional rigid body (110) is preferably formed of a rigid material, such as steel or plastic, and then may be plated with a copper rich material 122. Optionally, a plurality of metal alloy buttons (130) (of FIG. 1) may be fixed on a copper plated working surface (132) of the rigid body (110). The working surface is defined as one or more surface areas on the rigid body (110) of the implement (100) that come into contact with soils during an intended use of the implement (100). Note in FIG. 1, that the metal alloy buttons (130) are different from ordinary rivets that are used to fasten two or more layer of materials together. There is only one structural layer of the rigid body (110) beneath heads of the metal alloy buttons (130). The structural layer is defined as a rigid layer substantially sustaining a form of the implement 100, such as a core 134 of the rigid body (110) or the handle (120). Plated layers 122 or any decorative layers are not regarded as the structural layer.

In a case the functional implement (110) has a copper surface, the plurality of metal alloy buttons (130) may be made of other materials that have beneficial properties to plant growth when present in trace amounts in the growing soil. Such materials include: gold, silver, boron, zinc, manganese, cobalt, iodine, selenium, beryllium, titanium, and molybdenum. In an embodiment in which the working surface (132) does not support the copper rich material (122), at least one of the plurality of metal alloy buttons (130) is formed from the copper rich material (122). In either case, the metal alloy buttons contact the soil and leave trace amounts of metal particles in the soil as a result of abrasion by the soil, thereby enriching the soil for improved plant growth. Given the purpose of adding copper to the working surface of the rigid body (110), a skilled artisan may realize that one or more copper buttons or plates may simply be riveted to the rigid body (110). Additionally, a skilled artisan would realize that the riveting mechanism, as a means for either attaching trace metals or fastening another piece of material to the rigid body (110), can be replaced by welding, coining and cladding via the method utilized by the U.S. meant in forming, for example, a quarter.

In one aspect of manufacture of the present invention, the implement (100) of FIG. 1 has a core made of steel on which the copper is electroplated. The steel cores provide the shape, strength and function to the implement.

Preferably, the hand tools of the present invention are mass produced using industrial electroplating equipment. The steel core surfaces of the functional implement (110) are cleaned using various cleaning techniques prior to treatment with the plating solutions. Such cleaning techniques may utilize alkaline, acidic, or organic solvents as cleaning compositions, and may include spraying, scrubbing, vapor degreasing, ultrasonic cleaning, steam cleaning, and the like. Following the cleaning of the steel surfaces, preferably a first layer of nickel (140) (as shown by partial cutaway) is then applied to the clean surface of the steel cores by electroplating means. This first layer of nickel (140) is typically very thin and may be referred to as a strike plate, which enables the ultimate copper electroplate to adhere well to the steel surface. Several types of electroplating baths such as a Woods bath or a Watts bath may be used to apply the first layer of nickel (140).

To apply the nickel strike plate (140), the cores are loaded into a nickel containing electroplating bath, such as a Watts bath, which typically contains nickel sulfate hexahydrate (NiSO4.6H2O) is present in amounts in the range of about 150 to 300 grams (g) per liter (L), nickel chloride hexahydrate (NiCL2.6H2O) is present in amounts in the range of about 45 to 90 grams (g) per liter (L), boric acid (H3BO3) is present in amounts in the range of about 30 to 45 grams (g) per liter (L). Hydrochloric acid (HCl) is added to maintain the pH of the solution in the range of about 2 to 5.2. The temperature of the solution is maintained in the range of about 30-75 degrees centigrade. A voltage is applied to the system and the bath is operated at a current density in the range of about 10 to 60 amps per square foot. During the application of the nickel strike (140), the plating bath may be agitated such as with air agitation. The period of time sufficient to completely cover the surface of the functional steel cores with the desired thickness of nickel sufficient to form the first layer is generally from about 3 minutes to about 7 minutes. The longer periods of time compensate for the decrease in bath efficiency occurring when lower electrical currents are utilized. Likewise, shorter time periods may be used when higher electrical currents are applied.

The thickness of the first layer is controlled by the magnitude of the current and the length of time current is imparted to the cores. The adherence of the first layer of nickel (140), i.e. the strike plate (140), is primarily due to mechanical bonding in which the nickel applied on the steel surface fills pits and other irregularities in the steel surface, thereby mechanically bonding or anchoring the nickel layer to the surface. A stronger mechanical bond between the nickel and the surface of the steel cores may be formed by abrading the core 134 surface prior to being chemically cleaned, such as by etching in an acidic cleaning solution. After the first layer of nickel (140) has been applied to yield a continuous nickel surface completely covering the steel surface, the cores are removed from the nickel plating bath and are rinsed with water to remove any residual plating bath material.

Following the application of the nickel strike plate (140) on the steel surface of the cores, a layer of copper is then electroplated onto the nickel layer. Preferably, the copper is plated using an acid copper plating bath. Acid copper baths are relatively simple formulations, containing copper ions, additives, and either sulfate or fluoborate ions, along with the corresponding acids. The chemical cost of acid-copper baths is low and their compositions tend not to be critical. When compared with cyanide and alkaline non-cyanide baths, their effluent control is simpler, they are easier to control, and they are more stable. Acid copper baths also have high anode and cathode efficiencies and they can tolerate high current densities.

Preferably the acid copper bath is a high throw acid copper sulfate bath in which copper sulfate pentahydrate (CuSO4.5H2O) is present in amounts in the range of about 60-100 grams (g) per liter (L), sulfuric acid (H2SO4) is present in amounts in the range of about 180-270 grams (g) per liter (L), and chloride ions are present in amounts in the range of 50-120 milligrams (mg) per liter (L). The temperature of the solution is maintained in the range of about 20-45 degrees centigrade, and the system is operated at a current density in the range of about 15-60 amps per square foot until the desired coating of copper is obtained. The plating bath should be agitated with air agitation. Various additives may be added to the bath for use as anti-pitting agents, brighteners, levelers, stress reducers, and the like as desired.

In other embodiments, a copper plate may be electroplated directly on the cleaned steel cores by using an acid copper cyanide plating bath. A copper cyanide strike bath may be used to electroplate a copper strike plate on the steel surfaces of the cores. Thereafter, a thicker layer of copper may be electroplated on the copper strike by using an acid copper electroplating process or a high-efficiency copper cyanide process. A disadvantage of the copper cyanide plating baths is that the solutions are toxic and present a problem with the disposal of the effluent.

In other embodiments of the present invention, the core of the functional implement (110) of FIG. 1 may be made of an alternative material in place of steel provided that such material posses suitable structural characteristics in strength and rigidity as dictated by the particular function of the gardening tool. For example, the core of the rigid body (110) of the implement (100) may form from a plastic material that exhibits the requisite strength characteristics to enable it to function as such implement. In the case of plastic functional cores, the cores may be electroplated to provide an outer layer of copper on the implement portions of the gardening tools.

The plastic cores are thoroughly cleaned of any oil, grease or any plastic injection mold compounds. If the cores are not cleaned properly, the metal will peel off over time from the plated cores. After cleaning, the plastic cores are processed in an aggressive chromic/sulfuric acid bath to etch the plastic surfaces. The etched plastic cores are placed in a palladium chloride bath, which deposits palladium metal particles in the pits made on the etched plastic surface. The palladium metal particles are electrically conductive and enable a current to be passed over the cores so that they may be plated with copper using an acid copper plating bath, such as an acid copper sulfate solution described in the copper plating process above. Alternatively the cores may be exposed to acid metal salt solutions of gold, silver, boron, zinc, manganese, cobalt, selenium, beryllium, titanium, and molybdenum.

Although, only the gardening hand trowel is used to described the embodiments of present invention, a skilled artisan would appreciate applications of the present invention in other kind of gardening hand tools, such as shovels, spades, rakes, hoes, weeders, pruning saws, pruners, knives, shears, lopers, cultivators, tillers, plows, aerators, sod cutters, lawn mower blades, power edger blades, power weed trimming cable, chain saw blades, and the like. The working surfaces of the other kind of gardening hand tools may be similarly plated with copper. Their core materials may be steel or other rigid materials. Metal alloy buttons of desired metals may also be fixed on their working surfaces. Besides, although numerous metal elements have been mentioned above for the description of the present invention, a skilled artisan would realize yet many other metal elements may also be plated on implement surfaces of the various gardening hand tools.

While the above description and illustrations constitute preferred or alternate embodiments of the present invention, it will be appreciated that numerous variations may be made without departing from the scope of the invention, which is defined by the claims.

What is claimed is:
1. A gardening apparatus comprising:
a single rigid body providing a working surface; and
a copper rich material covering the working surface, wherein upon engaging an object with the work surface a portion of the copper rich material is transferred to the object; and
a plurality of metallic buttons communicating directly and only with the single rigid body.
2. The apparatus of claim 1, wherein the rigid body is formed from a material selected from a group comprising steel, nylon plastic, aluminum, ceramic, fiberglass composite, carbon fiber composite, epoxy resin, and iron.

3. The apparatus of claim 1, wherein the copper rich material is plated on the working surface.

4. The apparatus of claim 3, wherein the copper rich material comprises metal selected from a group comprising gold, silver, boron, zinc, manganese, cobalt, selenium, beryllium, titanium, and molybdenum.

5. The apparatus of claim 1, wherein the copper rich material is a metal sheet mechanically attached to the working surface.

6. The apparatus of claim 5, wherein the copper rich material comprises a metal selected from a group comprising gold, silver, boron, zinc, manganese, cobalt, selenium, beryllium, titanium, and molybdenum.

7. The apparatus of claim 5, wherein the metal sheet is mechanically attached to the working surface by means selected from a group comprising riveting, welding, coining and cladding.

8. The apparatus of claim 1, wherein the plurality of metal buttons comprise an alloy.

9. The apparatus of claim 1, wherein at least one of the plurality of metal buttons contains a metal selected from a group comprising gold, silver, boron, zinc, manganese, cobalt, selenium, beryllium, titanium, and molybdenum.

10. A soil manipulating apparatus comprising:
a rigid body providing a work surface;
a handle attached to the rigid body; and
a copper rich material plated onto the working surface; and
a plurality of metal buttons fixed on the working surface area of the soil manipulating apparatus, wherein there is only one structural layer of the soil manipulating apparatus engaged by the plurality of metal alloy buttons, and wherein upon engaging soil with the work surface of the soil manipulating apparatus abrasions between the soil manipulating apparatus and the soil cause particles of both the copper rich material and the plurality of metal alloy buttons to be deposited in the soil.

11. The apparatus of claim 10, in which the rigid body is selected from a group comprising of steel, nylon plastic, aluminum, ceramic, fiberglass composite, carbon fiber composite, epoxy resin and iron.

12. The apparatus of claim 10, wherein the copper rich material comprises a metal selected from the group comprising gold, silver, boron, zinc, manganese, cobalt, selenium, beryllium, titanium, and molybdenum.

13. The apparatus of claim 10, wherein the plurality of metal buttons comprises an alloy.

14. The apparatus of claim 10, wherein at least one of the plurality of metal buttons contains a metal selected from the group comprising gold, silver, boron, zinc, manganese, cobalt, selenium, beryllium, titanium, and molybdenum.

15. An apparatus for manipulating an object comprising:
a single rigid body providing a working surface;
a copper rich material plated on the working surface; and
a plurality of alloy buttons fixed on the working surface area of the single rigid body, wherein the plurality of metal alloy buttons engage only the single rigid body, and during an intended use of the apparatus for manipulating an object, abrasions between the apparatus for manipulating an object and an encountered object particles of both the copper rich material and the plurality of metal alloy buttons to be removed therefrom.

16. The apparatus of claim 15, wherein the rigid body is selected from a group comprising steel, nylon plastic, aluminum, ceramic, fiberglass composite, carbon fiber composite, epoxy resin, and iron.

17. The apparatus of claim 15, wherein the copper rich material comprises a metal selected from a group comprising gold, silver, boron, zinc, manganese, cobalt, selenium, beryllium, titanium, and molybdenum.

* * * * *